Patented Dec. 22, 1942

2,305,747

UNITED STATES PATENT OFFICE 2,305,747

COMPLEX CHROMIUM COMPOUNDS OF ORTHO-HYDROXYAZO DYESTUFFS AND PROCESS OF MAKING SAME

Fritz Straub, Kaiseraugst, and Emil Mannhart, Basel, Switzerland, assignors to Society of Chemical Industry in Basle, Basel, Switzerland No Drawing. Application May 24, 1940, Serial No. 337,082. In Switzerland June 6, 1939

5 Claims. (Cl. 260—151)

It has been found that valuable complex chromium compounds of ortho-hydroxyazo dyestuffs which contain sulfonic acid groups may be obtained if azo dyestuffs of the general formula

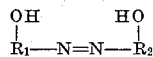

in which $R_1$ represents a substituted benzene nucleus, which contains as substituent at least one sulfonic acid group, and $R_2$—OH represents the radical of a 1-hydroxynaphthalene containing at least one halogen atom, and in which both hydroxyl groups stand in the ortho position to the azo group, are treated in alkaline medium in the presence of salts of aliphatic hydroxy carboxylic acids with agents yielding chromium.

As parent materials for the manufacture of these dyestuffs, ortho-aminophenols may be used, which contain at least one sulfonic acid group and which furthermore may contain other substituents in the benzene nucleus, such as alkyl groups—for example, the methyl group—or halogen atoms—for example, chlorine or bromine atoms.

The combination of the diazo compounds mentioned with the 1-hydroxynaphthalenes which contain at least one halogen atom as substituent, for example, at least one chlorine or bromine atom, which come in question as coupling components can take place in the usual manner, for example, in a caustic alkaline medium.

The dyestuffs of the above formula which are thus formed, and which may certainly also be converted into very fast chromium compounds on the fiber according to the usual dyeing processes, belong to that group of azo dyestuffs which are converted in part or entirely into sparingly soluble to insoluble complex chromium compounds by the usual chroming process, or which may not be thoroughly chromed, in which case the rapidity with which the primarily formed complex becomes insoluble may be the reason for the impossibility of obtaining a thorough chroming by the known processes.

Dyestuffs which form complex chromium compounds which are sparingly soluble to insoluble, and which therefore were formerly used for the creation of dyeings fast to milling and potting only by actually forming the complex on the fiber itself, can now, by the present process, be transformed in substance into soluble complex chromium compounds which are capable of being dyed in the normal manner. The dyeings obtained by the use of these dyestuffs containing chromium have fastness properties in particular so high a fastness to milling and potting which hitherto were incapable of attainment by the use of complex chromium compounds of acid wool dyestuffs prepared in substance. It is to be supposed that, in the formation of the present complex compounds, the aliphatic hydroxycarboxylic acids also take part, and that they are at least partially responsible for the improved solubility of the complexes obtained.

A group of dyestuffs which may be converted with particular advantage into complex chromium compounds by the present process is obtained when 3:6-dihalogen-1-hydroxy-2-diazobenzene sulfonic acids, particularly those having a sulfonic acid group in the 4-position, are combined with 5:8-dihalogen-1-hydroxynaphthalenes. The diazo compounds mentioned may be obtained, for example, from 1:3:6-trihalogen-2-diazobenzene-4-sulfonic acids by replacing the halogen atom in the 1-position by a hydroxyl group in an alkaline medium, for example, by addition of sodium carbonate to the diazo compound which has been prepared in the usual manner.

The present process consists of treating the dyestuffs, in the presence of salts of those aliphatic hydroxycarboxylic acids which are themselves capable of forming complex metal compounds in alkaline medium with agents capable of yielding chromium. Aliphatic hydroxy-carboxylic acids which contain at least two carboxyl groups, such as tartaric acid, are particularly suitable for the process. The solutions which are used for the chroming process may be obtained by adding a sufficient quantity of an alkali—for example, caustic alkali or alkali carbonate, but particularly caustic soda or a solution of caustic potash—to obtain a definite alkaline reaction to a solution of chromium tartrate. The chroming of the dyestuff takes place by heating the dyestuff in combination with a solution of this nature, either with or without pressure, in the presence of or the absence of dispersing agents, preferably in an aqueous medium.

The products obtained are suitable for the dyeing and printing of the most varied materials, but preferably for the dyeing of fibers of animal origin, such as wool or silk.

Example 1

A paste containing 48 parts of the azo dyestuff of the probable formula

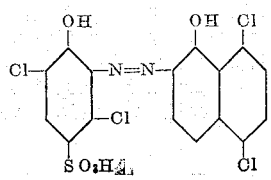

is stirred with 200 parts of water and, after addition of 275 parts by volume of chromium-sodium tartrate solution, containing 8.4 parts of $Cr_2O_3$, the whole is boiled for 12 hours under reflux. After cooling, the new chromium compound is precipitated by means of an addition of common salt and the reaction mixture is neutralized with concentrated hydrochloric acid and the precipitated chromium compound filtered off and dried.

It forms a dark blue powder, and dissolves in water to form a blue solution. It dyes wool in shades of blue that have good fastness to milling, potting and light.

The chromium-sodium tartrate used in this example is prepared as follows:

The chromium (corresponding to 76 parts of $Cr_2O_3$) which is contained in a solution of ½ mol chromium sulfate is precipitated at 40–50° C. by adding the required quantity of a soda solution of 10 per cent strength, and the precipitate is filtered at the pump and washed free of alkali. The residue, which is still moist, is stirred into a solution of 165 parts of tartaric acid in 1000 parts of water, and the mixture is heated to the boil and boiled for 15 minutes with stirring. 220 parts by volume of caustic soda of 30 per cent strength are now added. After the mixture has cooled, any small residue is removed by filtering and the filtrate is diluted with water to 2500 parts by volume.

The dyestuff paste used as parent material is prepared as follows:

27.5 parts of 1:3:6-trichloro-2-aminobenzene-4-sulfonic acid are diazotized as usual with 7 parts of sodium nitrite. Sodium carbonate is now added until a definite alkaline reaction is obtained, whereby one of the two chlorine atoms which stand in the ortho position to the amino group is converted into a hydroxyl group. The solution is now cooled to 2° C., and a solution containing 22 parts of 5:8-dichlor-1-naphthol, 80 parts of water and 15 parts by volume of caustic soda of 30 per cent strength is allowed to run in. After coupling is complete, the reaction liquor is filtered and the dyestuff obtained is washed with a solution of common salt.

Dyestuffs which also dye wool in blue shades which are of good fastness to milling, potting and light are also obtained by treating in the above manner those dyestuffs in the preparation of which use is made of the diazo compounds obtained from 22.5 parts of 1-hydroxy-2-amino-4-chlorobenzene-6-sulfonic acid, or 1-hydroxy-2-amino-6-chlorobenzene-4-sulfonic acid, or from 27 parts of 1-hydroxy-2-amino-4-bromobenzene-6-sulfonic acid or from 20.5 parts of 1-hydroxy-2-amino-4-methylbenzene-5- or -6-sulfonic acid, or when, in place of 22 parts of 5:8-dichloro-1-hydroxynaphthalene as coupling component, 18 parts of 8-chloro-1-hydroxynaphthalene or 22 parts of 8-bromo-1-hydroxynaphthalene are used.

Example 2

A dyebath is prepared which contains 4000 parts of water, 4 parts of concentrated sulfuric acid of 66° Bé., and 3 parts of the dyestuff obtained in Example 1, and 100 parts of wool, which has previously been well wetted-out, are entered at 60°. The temperature is raised to the boil in ½ hour and dyeing is continued for a further ½ hour at the boil. An additional 4 parts of concentrated sulfuric acid are added, and dyeing is continued at the boil for a further 1 hour. The wool is then rinsed and dried in the usual manner. It has been dyed in a fast shade of blue.

What we claim is:

1. Process for the manufacture of complex chromium compounds of ortho-hydroxyazo dyestuffs which contain sulfonic acid groups, comprising treating with agents yielding chromium the azo dyestuffs of the general formula

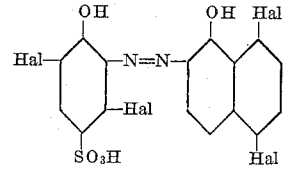

the treatment being conducted in an alkaline medium in the presence of salts of tartaric acid.

2. Process for the manufacture of complex chromium compounds of ortho-hydroxyazo dyestuffs which contain sulfonic acid groups, comprising treating with chromium tartrate solutions the azo dyestuffs of the general formula

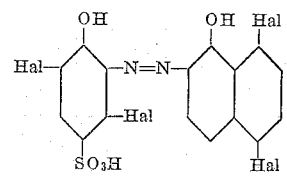

the treatment being conducted in an alkaline medium.

3. Process for the manufacture of complex chromium compounds of ortho-hydroxyazo dyestuffs which contain sulfonic acid groups, comprising treating with chromium tartrate solutions the azo dyestuff of the formula

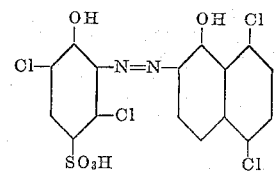

the treatment being conducted in an alkaline medium.

4. Water-soluble complex chromium compounds of azo dyestuffs of the general formula

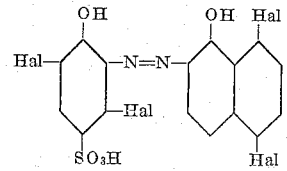

which compounds dye wool blue shades of good fastness to milling, potting and light.

5. Water-soluble complex chromium compounds of the azo dyestuff of the following formula

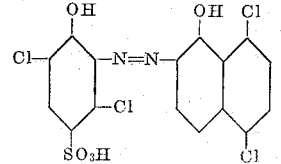

being a dark blue powder which dyes wool blue shades of good fastness to milling, potting and light.

FRITZ STRAUB.
EMIL MANNHART.